(12) United States Patent
Kohmoto et al.

(10) Patent No.: US 9,225,022 B2
(45) Date of Patent: Dec. 29, 2015

(54) POSITIVE ACTIVE MATERIAL FOR LITHIUM SECONDARY BATTERY AND LITHIUM SECONDARY BATTERY

(75) Inventors: Mariko Kohmoto, Kyoto (JP); Toru Tabuchi, Kyoto (JP); Tokuo Inamasu, Kyoto (JP); Toshiyuki Nukuda, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 1039 days.

(21) Appl. No.: 13/263,079

(22) PCT Filed: Jun. 16, 2010

(86) PCT No.: PCT/JP2010/060170
§ 371 (c)(1),
(2), (4) Date: Oct. 6, 2011

(87) PCT Pub. No.: WO2010/150686
PCT Pub. Date: Dec. 29, 2010

(65) Prior Publication Data
US 2012/0028122 A1   Feb. 2, 2012

(30) Foreign Application Priority Data

Jun. 24, 2009 (JP) ................. 2009-149366
Feb. 9, 2010 (JP) ................. 2010-026139

(51) Int. Cl.
| | |
|---|---|
| H01M 4/13 | (2010.01) |
| H01M 4/1397 | (2010.01) |
| H01M 4/58 | (2010.01) |
| C01B 25/45 | (2006.01) |
| H01M 4/136 | (2010.01) |
| H01M 4/36 | (2006.01) |
| H01M 4/62 | (2006.01) |
| H01M 10/052 | (2010.01) |
| H01M 4/02 | (2006.01) |

(52) U.S. Cl.
CPC ............ *H01M 4/5825* (2013.01); *C01B 25/45* (2013.01); *H01M 4/136* (2013.01); *H01M 4/366* (2013.01); *H01M 4/625* (2013.01); *H01M 10/052* (2013.01); *H01M 2004/021* (2013.01); *Y02E 60/122* (2013.01); *Y02T 10/7011* (2013.01)

(58) Field of Classification Search
CPC .......................... H01M 4/5825; H01M 4/136
USPC .................. 252/182.1; 429/223, 224, 213.95
See application file for complete search history.

(56) References Cited

U.S. PATENT DOCUMENTS

| | | | |
|---|---|---|---|
| 7,371,482 | B2 | 5/2008 | Wurm et al. |
| 7,670,721 | B2 | 3/2010 | Wurm et al. |
| 8,357,468 | B2 | 1/2013 | Exnar et al. |
| 2004/0175614 | A1* | 9/2004 | Wurm et al. .................. 429/221 |
| 2005/0196334 | A1 | 9/2005 | Saidi et al. |

FOREIGN PATENT DOCUMENTS

| | | |
|---|---|---|
| EP | 1936721 | 6/2008 |
| JP | 2001-307732 | 11/2001 |
| JP | 2003-323894 | 11/2003 |
| JP | 2004-063422 | 2/2004 |
| JP | 2005-071665 | 3/2005 |
| JP | 2006-331992 | 12/2006 |
| JP | 2008-130525 | 6/2008 |
| JP | 2008-243662 | 10/2008 |

OTHER PUBLICATIONS

"International Search Report of PCT Counterpart Application" issued on Jan. 17, 2012, p. 1-p. 6.
Marca M. Doeff, et al., "Optimization of carbon coatings on LiFePO4," Journal of Power Sources, vol. 163, Issue 1, Dec. 7, 2006, pp. 180-184.
"Search Report of European Counterpart Application", issued on Dec. 1, 2014, p. 1-p. 5.
Liu et al., "Electrochemical properties of rechargeable aqueous lithium ion batteries with an olivine-type cathode and a Nasicon-type anode", Journal of Power Source, Apr. 2009, pp. 706-710, vol. 189 Issue 1.

* cited by examiner

*Primary Examiner* — Ladan Mohaddes
(74) *Attorney, Agent, or Firm* — Jianq Chyun IP Office (57) ABSTRACT

The positive active material is a positive active material for a lithium secondary battery, including a lithium transition metal compound that has an olivine crystal structure and contains at least Ni, Fe, and Mn as transition metal elements, wherein when the sum of mole atoms of Ni, Fe, and Mn of transition metal elements contained in the lithium transition metal compound is expressed as 1, and the mole atomic ratios of Ni, Fe, and Mn are represented by a, b, and c (a+b+c=1, a>0, b>0, c>0), respectively, the following is satisfied: $0.85 \le c \le 0.92$ and $0.3 \le a/(a+b) \le 0.9$.

8 Claims, 1 Drawing Sheet

POSITIVE ACTIVE MATERIAL FOR LITHIUM SECONDARY BATTERY AND LITHIUM SECONDARY BATTERY

CROSS-REFERENCE TO RELATED APPLICATION

This application is a 371 of international application of PCT application serial no. PCT/JP2010/060170, filed on Jun. 16, 2010, which claims the priority benefit of Japan application no. 2009-149366, filed on Jun. 24, 2009 and Japan application no. 2010-026139, filed on Feb. 9, 2010. The entirety of each of the above-mentioned patent applications is hereby incorporated by reference herein and made a part of this specification.

TECHNICAL FIELD

The present invention relates to a lithium-manganese-iron-phosphate-based compound usable as a positive active material for a lithium secondary battery, and also to a lithium secondary battery using the same.

BACKGROUND ART

In recent years, as the power supply for portable devices such as mobile phones and laptop computers, electric vehicles, and the like, nonaqueous electrolyte secondary batteries, such as lithium secondary batteries, have been attracting attention. Lithium secondary batteries have high energy density, low self-discharge rate, and excellent cycle performance. Nowadays, the mainstream lithium secondary batteries are small consumer batteries, mainly including 2-Ah or lower batteries for mobile phones. A large number of proposals have been made as positive active materials for lithium secondary batteries. The most commonly known material is a lithium-containing transition metal oxide having an operating voltage of about 4 V. The basic structure of a lithium-containing transition metal oxide is lithium cobalt oxide ($LiCoO_2$), lithium nickel oxide ($LiNiO_2$), or lithium manganese oxide ($LiMn_2O_4$) with a spinel structure. In particular, a lithium cobalt oxide has excellent charge-discharge characteristics and energy density. Accordingly, a lithium cobalt oxide has been widely adopted as a positive active material for small-capacity lithium secondary batteries having a battery capacity up to 2 Ah.

However, in consideration of the future development of nonaqueous electrolyte batteries into medium-sized or large-sized batteries, especially into industrial batteries for which particularly high demands are expected, great importance is placed on safety. Accordingly, it cannot be said that the current specifications for small-sized batteries are necessarily sufficient. One of the factors thereof is the thermal instability of positive active materials. Various measures have been taken against thermal instability. However, no sufficient measures have been taken yet. Further, for industrial batteries, use in high-temperature environments, where small consumer batteries will not be used, should be assumed. In such a high-temperature environment, not only conventional nonaqueous electrolyte secondary batteries but also nickel-cadmium batteries or lead-acid batteries have extremely short life. Accordingly, under the present circumstances, none of conventional batteries satisfies the needs of users. Further, although a capacitor is the only one that is usable in such a temperature zone, capacitors do not satisfy the needs of users because of their low energy density. Therefore, there is a demand for a battery that lasts long life even in a high-temperature environment and has high energy density.

Recently, lithium iron phosphate ($LiFePO_4$), a polyanionic positive active material having excellent thermal stability, has been attracting attention. In the polyanion moiety of $LiFePO_4$, phosphorus and oxygen are linked together by a covalent bond. Accordingly, no oxygen is released even at high temperatures. Therefore, $LiFePO_4$ shows high safety even when all Li is removed from the Li site. Accordingly, by using $LiFePO_4$ as an active material for a battery, the safety of the battery can be dramatically improved. However, the operating potential of $LiFePO_4$ is low (about 3.4 V). Accordingly, the energy density of $LiFePO_4$ is lower than conventional 4-V class positive active materials. This low operating potential corresponds to the fact that a $Fe^{2+/3+}$ redox reaction takes place near 3.4 V (vs. $Li/Li^+$).

Meanwhile, a $Mn^{2+/3+}$ redox reaction takes place near 4.1 V (vs. $Li/Li^+$). Accordingly, studies have been made on lithium manganese phosphate ($LiMnPO_4$) having Mn in place of Fe at the transition metal moiety of $LiFePO_4$ in hope of obtaining an operating potential of about 4 V. However, as compared with $LiFePO_4$, the electron conductivity of this material is extremely lower. Accordingly, there has been a problem in that discharge capacity itself is hardly obtained.

A reductive reaction in which lithium is electrochemically inserted into a lithium transition metal phosphate compound proceeds through a two-phase reaction. Accordingly, in $LiFePO_4$, a plateau potential region occurs near 3.4 V (vs. $Li/Li^+$) corresponding to the $Fe^{2+/3+}$ redox potential. Then, in the case where a lithium transition metal phosphate compound contains a plurality of oxidizable and reducible elements as the transition metal, theoretically, a plurality of plateau potential regions appear each corresponding to the redox potential of each element. For example, in $LiFe_aMn_{1-a}PO_4$, two stages are observed, i.e., a potential region near 3.4 V (vs. $Li/Li^+$) corresponding to the $Fe^{2+/3+}$ redox potential and a potential region near 4.1 V (vs. $Li/Li^+$) corresponding to the $Mn^{2+/3+}$ redox potential.

Patent Document 1 describes the charge-discharge curves of batteries using, as positive active materials, $LiMn_{0.6}Fe_{0.4}PO_4$ (Example 1), $LiMn_{0.7}Fe_{0.3}PO_4$ (Example 2), and $LiMn_{0.75}Fe_{0.25}PO_4$ (Example 3). This document describes that in such a composition range, that is, in the composition range where the transition metal elements of a lithium transition metal phosphate compound are Mn and Fe, and the proportion of Mn in Mn and Fe is 0.6 to 0.75, a higher proportion of Mn results in a wider discharge region near 4 V corresponding to the $Mn^{2+/3+}$ redox potential.

However, an increase in the proportion of Mn in $LiFe_aMn_{1-a}PO_4$ reduces electron conductivity. Probably because of this, there has been a problem in that the entire discharging performance itself remarkably deteriorates.

In relation thereto, the invention defined in claim 1 of Patent Document 2 is "a positive active material to be contained in the positive electrode of a nonaqueous electrolyte battery, the positive active material containing a compound having an olivine structure represented by the general formula $Li_aMn_bFe_cM_dPO_4$, wherein M is one or more elements selected from Mg, Ti, V, Cr, Co, Ni, Cu, and Zn, and a, b, c, and d satisfy the relation 0<a<2, 0<b<0.8, 0<d<0.2, and b+c+d=1." Further, this document describes, in paragraph 0027: "in the compound having an olivine structure represented by $Li_aMn_bFe_cM_dPO_4$, when the element ratio b of Mn in the formula is within a range of more than 0 and less than 0.8, the battery 1 can be provided with higher battery capacity. Further, in this case, electron conductivity increases. Accordingly, the positive electrode 2 can be provided with improved electrical conductivity." However, this document describes, in paragraph 0026: "when the element ratio of Mn is 0.8 or more, the content of Mn that reduces electrical conductivity is too high. Accordingly, even when a part of Mn and/or a part of Fe is substituted with a predetermined element, it is difficult to increase electron conductivity." Meanwhile, in the present invention, it has been found that by applying Ni within a specific range to a material in which the element ratio of Mn is 0.9, the capacity is remarkably improved. Therefore, the present invention cannot be readily derived from the descriptions of Patent Document 2.

Further, the invention defined in claim 1 of Patent Document 3 is "a method for producing a positive electrode active material, including the step of mixing a metal-doped lithium manganese phosphate $LiMn_{1-x}M_xPO_4$ (wherein $0<x \leq 0.1$, and M represents a doping metal element) with a carbon source, and heat-treating the resulting mixture in an inert gas atmosphere." An object of the invention is "to provide a production method that enables the easy mass-production of a positive active material having rate characteristics suitable for non-aqueous electrolyte secondary batteries, and also to provide a high-performance nonaqueous electrolyte battery having a positive active material obtained by the method." Further, this document describes, in paragraph 0016: "in the above general formula: $LiMn_{1-x}M_xPO_4$, the doping metal element M other than Mn in the compound is not particularly limited, but is preferably at least one selected from Co, Ni, Fe, Mg, Zn, and Cu. The x representing the proportion of the metal element M other than Mn is $0<x \leq 0.1$, preferably $0.003 \leq x \leq 0.05$, more preferably $0.005 \leq x \leq 0.05$, more preferably $0.007 \leq x \leq 0.03$, and particularly $0.01 \leq x \leq 0.03$. The positive active material of the invention is characterized by the use of a metal-doped lithium manganese phosphate having a doping metal in an extremely small proportion." Thus, in this document, as candidates for the metal element M, Co, Ni, Fe, Mg, Zn, and Cu are listed equally without any distinction.

However, Patent Document 3 merely describes, in Examples, specific cases of substitution with Mg alone (0.01, 0.05, 0.10) and substitution with Ti alone (0.01, 0.05, 0.10). Therefore, from the descriptions of Patent Document 3, it cannot be readily derived that in the case where Mn is 0.9 and the substituting elements are Fe and Ni, the proportion of Ni in Fe and Ni needs to be 30% or more and 90% or less.

[Patent Document 1] JP-A-2001-307732
[Patent Document 2] JP-A-2004-63422
[Patent Document 3] JP-A-2008-130525

DISCLOSURE OF THE INVENTION

Problems to be Solved by the Invention

An object of the present invention is to provide a positive active material for a lithium secondary battery, which contains $LiMPO_4$ (M is transition metal) and is capable of achieving high discharge capacity even when the atomic ratio of Mn in M of $LiMPO_4$ is 85% or more (Mn is inexpensive and is capable of high operating potential).

Solutions to the Problems

The configuration and operation effects of the present invention are as shown below. However, the operation mechanisms described herein include presumptions. Whether it is right or wrong does not limit the present invention at all.

In order to solve the problems, the present invention employs the following measures.

(1) A positive active material for a lithium secondary battery comprising a lithium transition metal compound that has an olivine crystal structure and contains at least Ni, Fe, and Mn as transition metal elements has a feature that:

when the sum of mole atoms of Ni, Fe, and Mn of transition metal elements contained in the lithium transition metal compound is expressed as 1, and the mole atomic ratios of Ni, Fe, and Mn are represented by a, b, and c (a+b+c=1, a>0, b>0, c>0), respectively, the following is satisfied: $0.85 \leq c \leq 0.92$ and $0.3 \leq a/(a+b) \leq 0.9$; and the discharge capacity of a lithium secondary battery using the positive active material at the seventh cycle is 60 mAh/g or more.

(2) A positive active material for a lithium secondary battery comprising a lithium transition metal compound that has an olivine crystal structure and contains at least Ni, Fe, and Mn as transition metal elements has a feature that:

when the sum of mole atoms of Ni, Fe, and Mn of transition metal elements contained in the lithium transition metal compound is expressed as 1, and the mole atomic ratios of Ni, Fe, and Mn are represented by a, b, and c (a+b+c=1, a>0, b>0, c>0), respectively, the following is satisfied: $0.85 \leq c \leq 0.92$ and $0.3 \leq a/(a+b) \leq 0.9$; and in the $Ni_aFe_bMn_c$ triangular phase diagram, (a, b, c) is represented by values on the sides of or within the octagon ABCDEFGH whose vertices are point A (0.09, 0.01, 0.9), point B (0.04, 0.04, 0.92), point C (0.03, 0.05, 0.92), point D (0.027, 0.063, 0.91), point E (0.039, 0.091, 0.87), point F (0.075, 0.075, 0.85), point G (0.0915, 0.0435, 0.865), and point H (0.099, 0.011, 0.89).

(3) A positive active material for a lithium secondary battery comprising a lithium transition metal compound that has an olivine crystal structure and contains at least Ni, Fe, and Mn as transition metal elements has a feature that:

when the sum of mole atoms of Ni, Fe, and Mn of transition metal elements contained in the lithium transition metal compound is expressed as 1, and the mole atomic ratios of Ni, Fe, and Mn are represented by a, b, and c (a+b+c=1, a>0, b>0, c>0), respectively, the following is satisfied: $0.85 \leq c \leq 0.92$ and $0.3 \leq a/(a+b) \leq 0.9$; and in the $Ni_aFe_bMn_c$ triangular phase diagram, (a, b, c) is represented by values on the sides of or within the pentagon ABXYZ whose vertices are point A (0.09, 0.01, 0.9), point B (0.04, 0.04, 0.92), point X (0.03, 0.07, 0.9), point Y (0.065, 0.065, 0.87), and point Z (0.087, 0.043, 0.87).

(4) A positive active material for a lithium secondary battery is the positive active material for a lithium secondary battery according to any one of (1) to (3) above, wherein the lithium transition metal compound is a lithium transition metal phosphate compound.

(5) A positive active material for a lithium secondary battery is the positive active material for a lithium secondary battery according to (4) above, wherein the lithium transition metal phosphate compound is represented by $LiMPO_4$ ($0<x<1.2$, M is transition metal elements at least including Ni, Fe, and Mn, and the atomic ratio of Mn is 85% or more and 92% or less).

(6) A positive active material for a lithium secondary battery is the positive active material for a lithium secondary battery according to (5) above, wherein the lithium transition metal compound is $Li_xNi_aFe_bMn_cPO_4$ ($0<x<1.2$, a+b+c=1, a>0, b>0, c>0) where $0.85 \leq c \leq 0.92$ and $0.3 \leq a/(a+b) \leq 0.9$.

(7) A positive active material for a lithium secondary battery is a positive active material for a lithium secondary battery, comprising a lithium transition metal compound represented by $Li_xMPO_4$ ($0<x<1.2$, M is transition metal elements at least including Ni, Fe, and Mn, and the atomic ratio of Mn is 85% or more and 92% or less). Further, the positive active material has a feature that the discharge capacity of a lithium secondary battery using the positive active material at the seventh cycle is 60 mAh/g or more.

(8) A positive active material for a lithium secondary battery is the positive active material for a lithium secondary battery according to any one of (1) to (7) above, which is produced through hydrothermal synthesis by a hydrothermal method.

(9) A positive electrode of a lithium secondary battery contains the positive active material for a lithium secondary battery according to any one of (1) to (8) above.

(10) A lithium secondary battery includes a positive electrode containing the positive active material according to any one of (1) to (8), a negative electrode, and a nonaqueous electrolyte.

Effects of the Invention

According to the present invention, a positive active material for a lithium secondary battery, which contains $Li_xMPO_4$ (M is at least Ni, Fe, and Mn) and is capable of achieving high discharge capacity even when the atomic ratio of Mn in M of $LiMPO_4$ is 85% or more (Mn is inexpensive and is capable of high operating potential). This is achieved by specific amounts of Ni and Fe being contained as M in $Li_xMPO_4$.

DESCRIPTION OF EMBODIMENTS

In order to increase the capacity of a positive active material for a lithium secondary battery while maintaining its composition as close to $LiMnPO_4$ as possible, the present inventors have studied the replacement of a part of Fe in $LiMn_{0.9}Fe_{0.1}PO_4$ with Ni. As a result, they have found that the discharge capacity of $Li_xNi_aFe_bMn_{0.9}PO_4$ ($0<x<1.2$, $a+b=0.1$) remarkably increases when the range $0.3 \leq a/(a+b) \leq 0.9$ is satisfied. The present inventors have thus reached the present invention.

The atomic ratio of Mn is also important. As in Examples below, when the atomic ratio of Mn is $0.85 \leq c \leq 0.92$, and the range $0.3 \leq a/(a+b) \leq 0.9$ is satisfied, the discharge capacity of a lithium secondary battery using the positive active material at the seventh cycle can be 60 mAh/g or more.

Further, it has been found that within the above range, as in Examples below, when a positive active material whose (a, b, c) value in the $Ni_aFe_bMn_c$ triangular phase diagram is within a specific range is used, the discharge capacity of the cell at the seventh cycle is remarkably improved. In the case where (a, b, c) in the $Ni_aFe_bMn_c$ triangular phase diagram is represented by values on the sides of or within the octagon ABCDEFGH whose vertices are point A (0.09, 0.01, 0.9), point B (0.04, 0.04, 0.92), point C (0.03, 0.05, 0.92), point D (0.027, 0.063, 0.91), point E (0.039, 0.091, 0.87), point F (0.075, 0.075, 0.85), point G (0.0915, 0.0435, 0.865), and point H (0.099, 0.011, 0.89), by using a positive active material suitable for this case, the discharge capacity of a lithium secondary battery at the seventh cycle can be 60 mAh/g or more.

The discharge capacity of a lithium secondary battery at the seventh cycle is preferably 68 mAh/g or more, and more preferably 90 mAh/g or more. In cases where (a, b, c) is represented by values on the sides of or within the heptagon ABCDEFG, the discharge capacity at the seventh cycle can be 68 mAh/g or more. Further, within this range, in the case where (a, b, c) is represented by values on the sides of or within the pentagon ABXYZ whose vertices are point A (0.09, 0.01, 0.9), point B (0.04, 0.04, 0.92), point X (0.03, 0.07, 0.9), point Y (0.065, 0.065, 0.87), and point Z (0.087, 0.043, 0.87), the discharge capacity at the seventh cycle can be 90 mAh/g or more.

Further, in Examples below, a positive active material of $LiNi_aFe_bMn_cPO_4$ wherein x=1 is proposed. In the process of synthesis of an active material, the Li composition is particularly variable. Further, as a battery, such a positive active material releases Li upon charging. Accordingly, the Li coefficient x can reach 0. Further, in a battery, such a positive active material absorbs Li upon discharging. Accordingly, the Li coefficient x can reach 1.2. Thus, $0<x<1.2$.

The positive active material of the present invention is represented by the general formula $Li_xMPO_4$ ($0<x<1.2$, M is transition metal elements including at least Ni, Fe, and Mn). However, in the positive active material of the present invention, impurities may coexist inevitably or for the purpose of improving performance as an active material. Even in such a case, the effects of the present invention are not impaired. The positive active material of the present invention may contain small amounts of transition metal elements other than Mn, Fe, and Ni and boron. $SiO_4$ or the like may be contained in a part of the polyanion moiety, which is represented by $PO_4$, in the positive active material of the present invention.

Therefore, in the case where transition metal elements other than Mn, Fe, and Ni (e.g., Co) or boron is contained, when these elements are M', the positive active material of the present invention is represented by the general formula $Li_xNi_aFe_bMn_cM'_dPO_4$. Even in such a case, the positive active material of the present invention can be regarded as satisfying "when the sum of mole atoms of Ni, Fe, and Mn of transition metal elements is expressed as 1, and the mole atomic ratios of such Ni, Fe, and Mn are represented by a, b, and c (a+b+c=1, a>0, b>0, c>0), respectively, the following is satisfied: $0.85 \leq c \leq 0.92$ and $0.3 \leq a/(a+b)$ 0.9." Strictly, a+b+c+d=1. Accordingly, the mole atomic ratio c of Mn is less than "0.85 to 0.92". However, the amounts of the transition metal elements other than Mn, Fe, and Ni and boron are small as mentioned above. Where a+b+c+d=1, when the mole atomic ratio c of Mn is extremely smaller than 0.85 (e.g., c is 0.84 or less), such materials are excluded from the present invention.

A method for synthesizing the positive active material according to the present invention is not particularly limited as long as the method is capable of synthesizing single-phase crystals of $Li_xMPO_4$ type (M is transition metal). Specific examples of such methods include a solid-phase method, a liquid-phase method, a sol-gel method, and a hydrothermal method.

In particular, it is preferable to use a hydrothermal method. This is because a positive active material with a small particle size can be easily obtained.

As the hydrothermal method, a known general method can be employed. As the hydrothermal method, for example, the following method can be employed: an aqueous solution obtained by dissolving raw materials for the lithium transition metal compound is placed in a hermetically sealable vessel, and then the vessel is heated from the outside. Specifically, for example, a method in which an aqueous solution obtained by dissolving raw materials for the lithium manganese phosphate is placed in a hermetically sealable vessel, subsequently, the vessel is hermetically sealed, and the vessel is heated from the outside at a temperature of more than 100° C. and the heating makes the internal pressure about 0.5 to 1.5 MPa can be employed. When the above hydrothermal method is employed in hydrothermal synthesis, the smaller size of particles containing a lithium transition metal compound can be easily obtained.

In the hydrothermal synthesis, for example, in the case of synthesizing a lithium transition metal phosphate compound, raw materials for the lithium manganese phosphate including manganese, iron, nickel, lithium, and phosphate are mixed to form particles containing a lithium transition metal compound.

As raw materials for the lithium transition metal compound, various materials are usable. Examples of raw materials containing manganese (Mn) include manganese sulfate, manganese oxalate, and manganese acetate. Examples of raw materials containing iron (Fe) include iron sulfate, iron oxalate, and iron acetate. Examples of raw materials containing nickel (Ni) include nickel sulfate, nickel oxalate, and nickel acetate. Examples of raw materials containing lithium (Li) include lithium hydroxide and lithium carbonate. Examples of raw materials containing phosphate ($PO_4$) include ammonium phosphate, diammonium hydrogenphosphate, ammonium dihydrogenphosphate, and lithium phosphate.

Further, in order to compensate for electron conductivity, it is preferable to allow carbon to adhere to or coat the surface of positive active material particles mechanically or by the pyrolysis of an organic substance, for example.

In particular, in the lithium-transition-metal-phosphate-compound-based positive active material according to the present invention, in order for the effects of the present invention to be sufficiently exerted, it is important to sufficiently ensure electron conduction between particles by carbon or the like. In the synthesis example using a hydrothermal method described in Examples below, the raw material solution contains ascorbic acid. Therefore, in a heat treatment process, organic substances derived from ascorbic acid are decomposed, whereby carbon is given to the particle surface. However, such carbon alone is not necessarily sufficient to ensure the electron conduction between particles. Therefore, in Examples below, an organic substance, such as PVA, is allowed to coexist in the heat treatment process, thereby compensating for the electron conduction between particles.

The carbon source contained in the raw material solution is not limited to ascorbic acid. It is preferable that the carbon source has a molecular weight of 350 or less having one or more hydroxy groups in the molecule. Further, in the hydrothermal synthesis, water can be used as a solvent. Therefore, it is preferable that the carbon source is one that easily dissolves in water (water-soluble). Specifically, it is preferable that the carbon source is one that dissolves 1 mass % or more in 20° C. neutral water. In particular, monosaccharides, disaccharides, and organic acids with a molecular weight of 350 or less having two or more hydroxy groups in the molecule are preferable. Besides, the molecular weight of the compound having two or more hydroxy groups in the molecule mentioned above is usually 100 or more.

Examples of the monosaccharides include glucose, fructose, galactose, and mannose. Examples of the disaccharides include maltose, sucrose, and cellobiose. Examples of the organic acids include ascorbic acid (including erythorbic acid, an optical isomer), tartaric acid, mevalonic acid, quinic acid, shikimic acid, gallic acid, and caffeic acid. In particular, it is preferable to use sucrose, ascorbic acid, or tartaric acid. As a result, the discharge capacity of a lithium secondary battery can be further improved.

The organic substance to be applied in the heat treatment process is not limited to PVA (polyvinyl alcohol). As such organic substances, water-soluble compounds with a weight-average molecular weight of 500 or more having a hydroxy group in the molecule are usable. For example, polyalkylene glycols such as polyethylene glycols, polypropylene glycols, and polyethylene polypropylene glycols, hydrophilic vinyl polymers such as polyvinyl alcohols and polyhydroxyalkyl (meth)acrylates, and polyoxyethylene (alkyl)phenyl ethers such as polyoxyethylene (tetramethylbutyl)phenyl ethers are usable.

The hydrophilic vinyl polymer has a structural unit derived from a hydroxy-group-containing vinyl monomer. Specifically, the hydrophilic vinyl polymer has a structural unit derived from a vinyl monomer having at least one ethylenic unsaturation and a hydroxy group in the molecule.

Of the hydrophilic vinyl polymers, examples of the polyhydroxyalkyl (meth)acrylates include hydroxyethyl (meth)acrylates. Examples of the hydrophilic vinyl polymers also include, in addition to these, copolymers obtained by the copolymerization of hydroxy-group-containing vinyl monomers.

Besides, of the hydrophilic vinyl polymers, the polyvinyl alcohols are usually formed by hydrolyzing a polymerized vinyl acetate monomer. Such a polyvinyl alcohol has a structural unit derived from a vinyl monomer having at least one ethylenic unsaturation and a hydroxy group in the molecule. In the present invention, the hydrophilic vinyl polymers include polyvinyl alcohols.

The amount of the organic substance applied in the heat treatment process is preferably about 4 to 6 mass % in terms of carbon content relative to particles formed in the hydrothermal synthesis. As a result, the discharge capacity of a lithium secondary battery can be further improved.

As a heat treatment method in the heat treatment process, a known general method can be employed. With respect to conditions, the heat treatment process can be performed, for example, at a temperature of about 500 to 750° C. for about 0.5 to 2 hours in a nitrogen-gas-replaced atmosphere having a small amount of oxygen gas, etc. Besides, it is preferable that cooling after the heat treatment is performed slowly, for example, at a cooling rate not exceeding −1° C./min.

When the positive active material according to the present invention is used in a positive electrode for a lithium secondary battery, it is preferable that the positive active material is a powder with an average particle size of 100 μm or less. Particularly, a positive active material with a smaller particle diameter is more desirable. It is preferable that the average particle size of secondary particles is 0.5 to 20 μm, and it is more preferable that the particle diameter of primary particles is 1 to 500 nm. Further, for the improvement of the high-rate performance of the positive electrode, powder particles having a larger specific surface area are more desirable. The specific surface area is preferably 1 to 100 $m^2/g$, and more preferably 5 to 100 $m^2/g$. In order to obtain a powder with a predetermined shape, a crusher or a classifier can be used. For example, a mortar, a ball mill, a sand mill, a vibration ball mill, a planet ball mill, a jet mill, a counter jet mill, a swirling flow type jet mill, a sieve, or the like can be used. At the time of milling, wet milling may be employed, where water or an organic solvent, such as alcohol or hexane, is allowed to coexist. The classification method is not particularly limited. Both in dry classification and wet classification, a sieve, an air classifier, or the like can be used as required.

With respect to an electric conductor and a binder, well known ones may be used according to well known formulations.

With respect to the moisture content of the positive electrode containing the positive active material of the present invention, a smaller content is more desirable. Specifically, it is preferable that the content is less than 2000 ppm.

Further, in terms of the balance with the energy density of a battery, the thickness of the electrode composite material layer applied to the present invention is preferably 20 to 500 μm.

A negative electrode of the battery according to the present invention is not limited. Examples of materials for the negative electrode include lithium metal and lithium alloys (lithium-metal-containing alloys such as lithium-aluminum, lithium-lead, lithium-tin, lithium-aluminum-tin, lithium-gallium, and Wood's metal), as well as alloys capable of absorbing/releasing lithium, carbon materials (e.g., graphite, hard carbon, low-temperature-sintered carbon, amorphous carbon, etc.), metal oxides, lithium metal oxides ($Li_4Ti_5O_{12}$, etc.), and polyphosphate compounds. Of these materials, graphite has an operating potential extremely close to metallic lithium, and thus enables charge-discharge at a high operating voltage. Therefore, graphite is a preferred negative electrode material. As graphite, artificial graphite or natural graphite is preferably used, for example. In particular, it is preferable to use graphite having a particle surface modified with amorphous carbon or the like. As a result, gas generation during charging can be reduced.

Generally, a lithium secondary battery includes a positive electrode, a negative electrode, and a nonaqueous electrolyte in which an electrolyte salt is contained in a nonaqueous solvent. Generally, a separator is provided between the positive electrode and the negative electrode. Further, an exterior body for packaging them is provided.

Examples of the nonaqueous solvent include a nonaqueous solvent made of one of the following: cyclic carbonates such as propylene carbonate and ethylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran and derivatives thereof, ethers such as 1,3-dioxane, 1,4-dioxane, 1,2-dimethoxyethane, 1,4-dibutoxyethane, and methyl diglyme; nitriles such as acetonitrile and benzonitrile; dioxolane and derivatives thereof; and ethylene sulfide, sulfolane, sultone, and derivatives thereof. Examples thereof also include a mixture of two or more of these nonaqueous solvents. However, the nonaqueous solvents are not limited thereto.

Examples of the electrolyte salts include ionic compounds such as $LiBF_4$ and $LiPF_6$. These ionic compounds may be used alone or as a mixture of two or more kinds. The concentration of the electrolyte salt in the nonaqueous electrolyte is preferably 0.5 mold to 5 mold, and still more preferably 1 mold to 2.5 mol/l. As a result, a lithium secondary battery having high battery characteristics can be reliably obtained.

EXAMPLES

Hereinafter, the method for producing a lithium secondary battery of the present invention will be illustrated. However, the present invention is not limited to the following embodiments.

Example 1

A solution prepared by dissolving $LiOH.H_2O$ in ion-exchange water and a solution prepared by dissolving $(NH_4)_2HPO_4$ in ion-exchange water were mixed, and the resulting mixed solution was stirred for 2 hours. Besides, when the stirring time at this time varies, the solution pH is not constant. In order to obtain a constant product, it is preferable to fix the stirring time. In this example, the pH of the mixed solution after stirring for 2 hours was about 8. Meanwhile, $MnSO_4.5H_2O$, $FeSO_4.7H_2O$, and $NiSO_4.6H_2O$ were dissolved in water containing ascorbic acid dissolved therein. The amount of ascorbic acid herein was adjusted to 0.025 in terms of molar ratio relative to $MnSO_4$. Next, the solution was added to the mixed solution of $LiOH.H_2O$ and $(NH_4)_2HPO_4$ in a nitrogen atmosphere. Besides, the purpose of employing a nitrogen atmosphere at this time is to reduce the possibility that oxides derived from the oxidation of $Fe^{2+}$ into $Fe^{3+}$ are present in the final product as impurities. A precursor solution was obtained through the above operation. Besides, Li:P:Mn:Fe:Ni in the precursor solution was adjusted so that their molar ratio was 2:1:0.90:0.07:0.03. This solution was transferred to a cylindrical vessel made of polytetrafluoroethylene. The vessel was set to a temperature controller. The atmosphere in the vessel was sufficiently replaced with nitrogen, and then the vessel was hermetically sealed. The vessel was subjected to stirring at a temperature of 170° C. for 12 hours at 150 rpm to perform hydrothermal synthesis. After the reaction, the solution was filtered, and the resulting precipitate was thoroughly washed with deionized water and acetone. Subsequently, the precipitate was vacuum-dried at 120° C. for 5 hours. The obtained powder was mixed with an about 1.1 times larger mass of polyvinyl alcohol powder (PVA, polymerization degree: 1,500). To the mixture was further added a small amount of water warmed to 60° C. Subsequently, the mixture was mixed/kneaded in a mortar into a gum-like paste. Next, the paste was heat-treated in a N2 atmosphere at 700° C. for 1 hour. As a result, a positive active material for a lithium secondary battery of Example 1 ($LiNi_{0.03}Fe_{0.07}Mn_{0.9}PO_4$), which is $Li_xNi_aFe_bMn_cPO_4$ (a/(a+b)=0.3), was obtained.

Example 2

The amounts of $MnSO_4.5H_2O$, $FeSO_4.7H_2O$, and $NiSO_4.6H_2O$ were adjusted so that the Li:P:Mn:Fe:Ni ratio in a precursor solution was 2:1:0.87:0.091:0.039. In otherwise the same manner as in Example 1, a positive active material for a lithium secondary battery of Example 2 ($LiNi_{0.039}Fe_{0.091}Mn_{0.87}PO_4$) was obtained.

Example 3

The amounts of $MnSO_4.5H_2O$, $FeSO_4.7H_2O$, and $NiSO_4.6H_2O$ were adjusted so that the Li:P:Mn:Fe:Ni ratio in a precursor solution was 2:1:0.91:0.063:0.027. In otherwise the same manner as in Example 1, a positive active material for a lithium secondary battery of Example 3 ($LiNi_{0.027}Fe_{0.063}Mn_{0.91}PO_4$) was obtained.

Example 4

The amounts of $MnSO_4.5H_2O$, $FeSO_4.7H_2O$, and $NiSO_4.6H_2O$ were adjusted so that the Li:P:Mn:Fe:Ni ratio in a precursor solution was 2:1:0.85:0.075:0.075. In otherwise the same manner as in Example 1, a positive active material for a lithium secondary battery of Example 4 ($LiNi_{0.075}Fe_{0.075}Mn_{0.85}PO_4$) was obtained.

Example 5

The amounts of $MnSO_4.5H_2O$, $FeSO_4.7H_2O$, and $NiSO_4.6H_2O$ were adjusted so that the Li:P:Mn:Fe:Ni ratio in a precursor solution was 2:1:0.86:0.07:0.07. In otherwise the same manner as in Example 1, a positive active material for a lithium secondary battery of Example 5 (LiNi$_{0.07}$Fe$_{0.07}$Mn$_{0.86}$PO$_4$) was obtained.

Example 6

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.87:0.065:0.065. In otherwise the same manner as in Example 1, a positive active material for a lithium secondary battery of Example 6 (LiNi$_{0.065}$Fe$_{0.065}$Mn$_{0.87}$PO$_4$) was obtained.

Example 7

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.87:0.065:0.065. In otherwise the same manner as in Example 1, a positive active material for a lithium secondary battery of Example 7 (LiNi$_{0.05}$Fe$_{0.05}$Mn$_{0.9}$PO$_4$) was obtained.

Example 8

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.92:0.04:0.04. In otherwise the same manner as in Example 1, a positive active material for a lithium secondary battery of Example 8 (LiNi$_{0.04}$Fe$_{0.04}$Mn$_{0.92}$PO$_4$) was obtained.

Example 9

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.92:0.04:0.04. In otherwise the same manner as in Example 1, a positive active material for a lithium secondary battery of Example 9 (LiNi$_{0.081}$Fe$_{0.049}$Mn$_{0.87}$PO$_4$) was obtained.

Example 10

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.87:0.043:0.087. In otherwise the same manner as in Example 1, a positive active material for a lithium secondary battery of Example 10 (LiNi$_{0.087}$Fe$_{0.043}$Mn$_{0.87}$PO$_4$) was obtained.

Example 11

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.865:0.0435:0.0915. In otherwise the same manner as in Example 1, a positive active material for a lithium secondary battery of Example 11 (LiNi$_{0.0915}$Fe$_{0.0435}$Mn$_{0.865}$PO$_4$) was obtained.

Example 12

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.90:0.03:0.07. In otherwise the same manner as in Example 1, a positive active material for a lithium secondary battery of Example 12 (LiNi$_{0.07}$Fe$_{0.03}$Mn$_{0.9}$PO$_4$) was obtained.

Example 13

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.90:0.01:0.09. In otherwise the same manner as in Example 1, a positive active material for a lithium secondary battery of Example 13 (LiNi$_{0.09}$Fe$_{0.01}$Mn$_{0.9}$PO$_4$) was obtained.

Example 14

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1: 0.89:0.011:0.099. In otherwise the same manner as in Example 1, a positive active material for a lithium secondary battery of Example 14 (LiNi$_{0.099}$Fe$_{0.011}$Mn$_{0.89}$PO$_4$) was obtained.

Example 15

The amounts of MnSO$_4$.5H$_2$O, FeSO$_4$.7H$_2$O, NiSO$_4$.6H$_2$O, and CoSO$_4$.7H$_2$O were adjusted so that the Li:Pi:Mn:Fe:Ni:Co ratio in a precursor solution was 2:1:0.90: 0.05:0.025:0.025. In otherwise the same manner as in Example 1, a positive active material for a lithium secondary battery of Example 15 (LiNi$_{0.025}$CO$_{0.025}$Fe$_{0.05}$Mn$_{0.9}$PO$_4$) was obtained. Besides, (a, b, c) of this positive active material in the Ni$_a$Fe$_b$Mn$_c$ triangular phase diagram is (0.026, 0.051, 0.923). This was rounded off to point C (0.03, 0.05, 0.92).

Comparative Example 1

Without adding NiSO$_4$.6H$_2$O, MnSO$_4$.5H$_2$O and FeSO$_4$.7H$_2$O were mixed so that the Li:P:Mn:Fe ratio in a precursor solution was 2:1:0.90:0.1. In otherwise the same manner as in Example 1, a positive active material for a lithium secondary battery of Comparative Example 1 (LiFe$_{0.1}$Mn$_{0.9}$PO$_4$) was obtained.

Comparative Example 2

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.90:0.09:0.01. In otherwise the same manner as in Example 1, a positive active material for a lithium secondary battery of Comparative Example 2 (LiNi$_{0.01}$Fe$_{0.09}$Mn$_{0.9}$PO$_4$) was obtained.

Comparative Example 3

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.90:0.08:0.02. In otherwise the same manner as in Example 1, a positive active material for a lithium secondary battery of Comparative Example 3 (LiNi$_{0.02}$Fe$_{0.08}$Mn$_{0.9}$PO$_4$) was obtained.

Comparative Example 4

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.92:0.056:0.024. In otherwise the same manner as in Example 1, a positive active material for a lithium secondary battery of Comparative Example 4 (LiNi$_{0.024}$Fe$_{0.056}$Mn$_{0.92}$PO$_4$) was obtained.

Comparative Example 5

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.94:0.03:0.03. In otherwise the same manner as in Example 1, a positive active material for a lithium secondary battery of Comparative Example 5 (LiNi$_{0.03}$Fe$_{0.03}$Mn$_{0.94}$PO$_4$) was obtained.

Comparative Example 6

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.87:0.013:0.117. In otherwise the same manner as in Example 1, a positive active material for a lithium secondary battery of Comparative Example 6 (LiNi$_{0.117}$Fe$_{0.013}$Mn$_{0.87}$PO$_4$) was obtained.

Comparative Example 7

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.88:0.012:0.108. In otherwise the same manner as in Example 1, a positive active material for a lithium secondary battery of Comparative Example 7 (LiNi$_{0.108}$Fe$_{0.012}$Mn$_{0.88}$PO$_4$) was obtained.

Comparative Example 8

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.91:0.009:0.081. In otherwise the same manner as in Example 1, a positive active material for a lithium secondary battery of Comparative Example 8 (LiNi$_{0.081}$Fe$_{0.009}$Mn$_{0.91}$PO$_4$) was obtained.

Comparative Example 9

The amounts of MnSO$_4$.5H$_2$O, FeSO$_4$.7H$_2$O, and NiSO$_4$.6H$_2$O were adjusted so that the Li:P:Mn:Fe:Ni ratio in a precursor solution was 2:1:0.92:0.008:0.072. In otherwise the same manner as in Example 1, a positive active material for a lithium secondary battery of Comparative Example 9 (LiNi$_{0.072}$Fe$_{0.008}$Mn$_{0.92}$PO$_4$) was obtained.

Comparative Example 10

Without adding FeSO$_4$.7H$_2$O, MnSO$_4$.5H$_2$O and NiSO$_4$.6H$_2$O were mixed so that the Li:P:Mn:Ni ratio in a precursor solution was 2:1:0.9:0.1. In otherwise the same manner as in Example 1, a positive active material for a lithium secondary battery of Comparative Example 10 (LiNi$_{0.1}$Mn$_{0.9}$PO$_4$) was obtained.

<Charge-Discharge Test>

The discharge performance of the positive active materials of Examples 1 to 14 and Comparative Examples 1 to 10 was examined by the following method. First, a working electrode for evaluating positive active materials was prepared according to the following procedure. The synthesized active material and acetylene black (AB) weighed to a mass ratio of 80:8 were pulverized and mixed in a mortar. Next, after an N-methylpyrrolidone (NMP) solution of PVdF (product number: #1120) was added dropwise thereto, the mixed powder was kneaded. The solution was added dropwise in such a manner that the ratio between the mass of the solution (in terms of solids) and the mass of the positive active material was 80 (positive active material): 12 (PVdF). Subsequently, for viscosity control, an appropriate amount of NMP was further added to the kneaded product. A positive electrode paste (positive active material:AB:PVdF=80:8:12, total solids concentration: 30 mass %) was thus obtained. The positive electrode paste was applied to an aluminum mesh plate, and dried at 80° C. for 30 minutes. Subsequently, the positive electrode paste was pressed and dried under reduced pressure. A working electrode was thus obtained. Then, using the working electrode, a counter electrode and a reference electrode made of metallic Li, and a nonaqueous electrolytic solution, a three-electrode glass cell was prepared. The nonaqueous electrolyte solution used is obtained by dissolving LiPF$_6$ to a concentration of 1 mold in a mixed solvent of ethylene carbonate and diethyl carbonate mixed in a volume ratio of 1:1.

The charge-discharge test was performed at a temperature of 25° C. In the charge-discharge test, charge was constant-current constant-potential charge at a charge current of 0.1 CmA and a charge set potential of 4.3 V (vs. Li/Li$^+$) for a charge time of 15 hours. Discharge was constant-current discharge at a discharge current of 0.1 C mA to an end potential of 2.0 V (vs. Li/Li$^+$). Here, in the test for all of Examples and Comparative Examples, the current value (CmA) was determined on the assumption that the theoretical capacity of the positive active material was 171 mAh/g. Besides, as is clear from the procedure described in Examples, positive active materials herein contain, in addition to lithium transition metal compounds, carbon applied before the heat treatment process. The positive active materials of all Examples and Comparative Examples described therein contain 3 to 5 mass % of carbon.

The above charge-discharge was performed for seven cycles. Besides, an interval of 30 minutes was provided between the completion of charge and the start of discharge and also between the completion of discharge and the start of charge. The discharge capacity (mAh) from the start of charge until the end potential of 2 V was measured.

Figure 1:
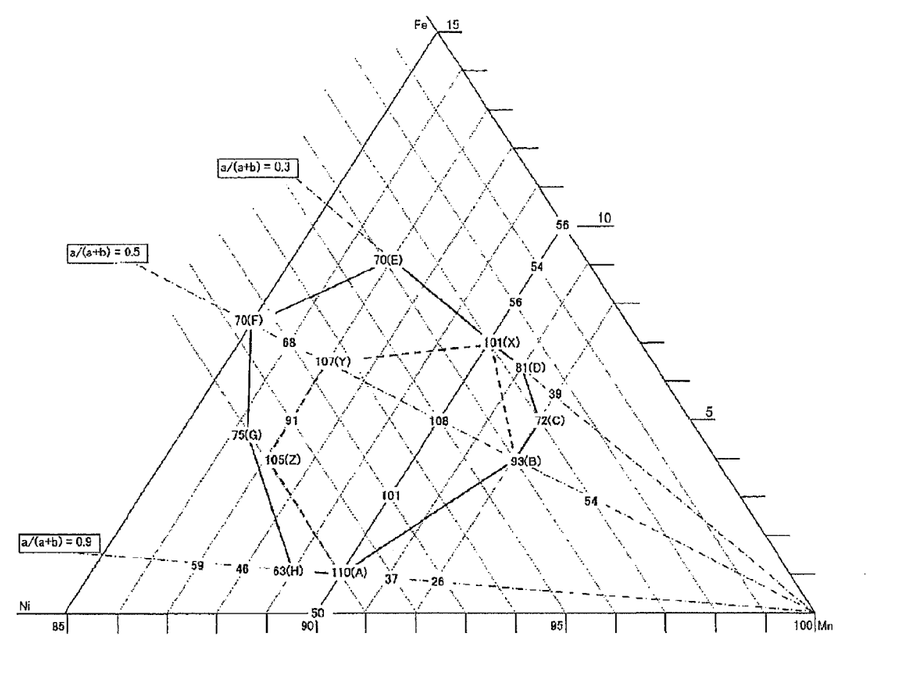
FIG. 1 shows the positions of positive active materials of Examples and Comparative Examples in the $Ni_aFe_bMn_c$ triangular phase diagram, together with the discharge capacity values of cells using those positive active materials at the seventh cycle.

Table 1 shows the discharge capacity of cells (lithium secondary batteries) using the positive active materials of Examples 1 to 14 and Comparative Examples 1 to 10 at the first cycle and the seventh cycle. FIG. 1 shows the positions of positive active materials of Examples and Comparative Examples in the Ni$_a$Fe$_b$Mn$_c$ triangular phase diagram, together with the discharge capacity value of each cell at the seventh cycle. Generally, after a battery is assembled, in the beginning of charge-discharge, the discharge capacity value of the battery varies such that it slowly increases or slowly decreases. Then, after several cycles, the discharge capacity value stabilizes. The same tendency is seen in the lithium secondary battery of the present invention. Therefore, the characteristics of the battery of the present invention were evaluated from the discharge capacity of the cell at the seventh cycle.

TABLE 1

| | a (Ni) | b (Fe) | c (Mn) | a/(a + b) | Discharge capacity at first cycle mAh/g | Discharge capacity at seventh cycle mAh/g | Remarks |
|---|---|---|---|---|---|---|---|
| Comparative Example 1 | 0 | 0.1 | 0.9 | 0 | 38 | 56 | |

TABLE 1-continued

|  | a (Ni) | b (Fe) | c (Mn) | a/(a + b) | Discharge capacity at first cycle mAh/g | Discharge capacity at seventh cycle mAh/g | Remarks |
|---|---|---|---|---|---|---|---|
| Comparative Example 2 | 0.01 | 0.09 | 0.9 | 0.1 | 50 | 54 | |
| Comparative Example 3 | 0.02 | 0.08 | 0.9 | 0.2 | 56 | 56 | |
| Example 1 | 0.03 | 0.07 | 0.9 | 0.3 | 95 | 101 | X |
| Example 2 | 0.039 | 0.091 | 0.87 | 0.3 | 53 | 70 | E |
| Example 3 | 0.027 | 0.063 | 0.91 | 0.3 | 85 | 81 | D |
| Comparative Example 4 | 0.024 | 0.056 | 0.92 | 0.3 | 30 | 39 | |
| Example 15 | 0.026 | 0.051 | 0.923 | 0.34 | 64 | 72 | C |
| Example 4 | 0.075 | 0.075 | 0.85 | 0.5 | 41 | 70 | F |
| Example 5 | 0.07 | 0.07 | 0.86 | 0.5 | 54 | 68 | |
| Example 6 | 0.065 | 0.065 | 0.87 | 0.5 | 96 | 107 | Y |
| Example 7 | 0.05 | 0.05 | 0.9 | 0.5 | 113 | 108 | |
| Example 8 | 0.04 | 0.04 | 0.92 | 0.5 | 87 | 93 | B |
| Comparative Example 5 | 0.03 | 0.03 | 0.94 | 0.5 | 38 | 54 | |
| Example 9 | 0.081 | 0.049 | 0.87 | 0.62 | 98 | 91 | |
| Example 10 | 0.087 | 0.043 | 0.87 | 0.67 | 101 | 105 | Z |
| Example 11 | 0.0915 | 0.0435 | 0.865 | 0.68 | 65 | 75 | G |
| Example 12 | 0.07 | 0.03 | 0.9 | 0.7 | 110 | 101 | |
| Example 13 | 0.09 | 0.01 | 0.9 | 0.9 | 110 | 110 | A |
| Example 14 | 0.099 | 0.011 | 0.89 | 0.9 | 58 | 63 | H |
| Comparative Example 6 | 0.117 | 0.013 | 0.87 | 0.9 | 51 | 59 | |
| Comparative Example 7 | 0.108 | 0.012 | 0.88 | 0.9 | 41 | 46 | |
| Comparative Example 8 | 0.081 | 0.009 | 0.91 | 0.9 | 31 | 37 | |
| Comparative Example 9 | 0.072 | 0.008 | 0.92 | 0.9 | 23 | 26 | |
| Comparative Example 10 | 0.1 | 0 | 0.9 | 1 | 43 | 50 | |

Table 1 and FIG. 1 show that cells containing the positive active materials of Example 1 to 15 have high discharge capacity at the seventh cycle (60 mAh/g or more). These positive active materials are lithium-manganese-phosphate-based positive active materials of $Li_xNi_aFe_bMn_cPO_4$, wherein $0.85 \leq c \leq 0.92$ and $0.3 \leq a/(a+b) \leq 0.9$. Further, in these positive active materials, (a, b, c) values in the $Ni_aFe_bMn_c$ triangular phase diagram are on the sides of or within the octagon ABCDEFGH whose vertices are point A (0.09, 0.01, 0.9), point B (0.04, 0.04, 0.92), point C (0.03, 0.05, 0.92), point D (0.027, 0.063, 0.91), point E (0.039, 0.091, 0.87), point F (0.075, 0.075, 0.85), point G (0.0915, 0.0435, 0.865), and point H (0.099, 0.011, 0.89).

In particular, as shown in FIG. 1, in the case where (a, b, c) is represented by values on the sides of or within the pentagon ABXYZ whose vertices are point A (0.09, 0.01, 0.9), point B (0.04, 0.04, 0.92), point X (0.03, 0.07, 0.9), point Y (0.065, 0.065, 0.87), and point Z (0.087, 0.043, 0.87) (Examples 1, 6 to 10, 12, and 13), the discharge capacity in a cell using the positive active material of the present invention at the seventh cycle is 90 mAh/g or more, which is remarkable improvement.

In contrast, as shown in Table 1 and FIG. 1, in a cell using a positive active material where (a, b) is within a range of $0.3 > a/(a+b)$ and $0.9 < a/(a+b)$, the discharge capacity at the seventh cycle decreases to less than 60 mAh/g (Comparative Examples 1 to 3 and 10). Thus, in order to improve the discharge capacity of a lithium secondary battery, it is preferable that (a, b) in the positive active material is $0.3 \leq a/(a+b) \leq 0.9$.

Further, the discharge capacity decreases also when $0.85 > c$ and $0.94 \leq c$ (Comparative Example 5). Therefore, in order to improve the discharge capacity of a lithium secondary battery, it is necessary that c in the above positive active material is $0.85 \leq c \leq 0.92$.

Next, the present inventors performed an intermittent discharge test on the glass cells of Comparative Example 1, Comparative Example 2, Example 1, Example 5, Example 6, and Comparative Example 6, which repeats the operation of maintaining an open-circuit state for 90 minutes every 30 minutes of discharge. This test is for the evaluation of the performance of a positive active material under the conditions where the influences of IR resistance of a cell and the ion diffusion rate are eliminated as much as possible. Here, a discharge current of 0.1 CmA was employed. From the obtained open circuit potential curve (OCP curve), the accumulated capacity discharged until an open circuit potential of 3.0 V was determined. As a result, the accumulate capacities of Comparative Example 1, Comparative Example 2, Example 1, Example 12, Example 13, and Comparative Example 10 were 92, 92, 132, 114, 121, and 63 mAh/g, respectively. It was thus found that even under these evaluation conditions, it is still preferable that $0.3 \leq a/(a+b) \leq 0.9$, and, in particular, it is more preferable that $a/(a+b)=0.3$.

INDUSTRIAL APPLICABILITY

Lithium secondary batteries using the positive active material of the present invention are suitable for application to the field where particularly higher-capacity industrial batteries are demanded, such as electric vehicles that are awaiting further development. Therefore, the industrial applicability in such a lithium secondary battery is extremely great.

What is claimed is:

1. A positive active material for a lithium secondary battery comprising a lithium transition metal compound that has an olivine crystal structure and contains at least Ni, Fe, and Mn as transition metal elements, wherein each mole atomic ratio of Ni, Fe, and Mn is represented by a, b, and c (a+b+c=1, a>0, b>0, c>0), respectively, the following is satisfied: $0.87 \leq c \leq 0.92$ and $0.3 \leq a/(a+b) \leq 0.9$, and wherein in a $Ni_aFe_bMn_c$ triangular phase diagram, (a, b, c) is represented by values on sides of or within a pentagon ABXYZ whose vertices are point A (0.09, 0.01, 0.9), point B (0.04, 0.04, 0.92), point X (0.03, 0.07, 0.9), point Y (0.065, 0.065, 0.87), and point Z (0.087, 0.043, 0.87); and wherein the lithium transition metal compound is a lithium transition metal phosphate compound.

2. The positive active material for a lithium secondary battery according to claim 1, wherein the lithium transition metal phosphate compound is represented by $Li_xMPO_4$ (0<x<1.2, M is transition metal elements at least including Ni, Fe, and Mn, and an atomic ratio of Mn is 85% or more and 92% or less).

3. The positive active material for a lithium secondary battery according to claim 2, wherein the lithium transition metal compound is $Li_xNi_aFe_bMn_cPO_4$ (0<x<1.2, a+b+c=1, a>0, b>0, c>0) where $0.85 \leq c \leq 0.92$ and $0.3 \leq a/(a+b) \leq 0.9$.

4. The positive active material for a lithium secondary battery according to claim 1, which is produced through synthesis by a hydrothermal method.

5. A positive electrode comprising the positive active material for a lithium secondary battery according to claim 1.

6. A lithium secondary battery comprising the positive electrode according to claim 5, a negative electrode, and a nonaqueous electrolyte.

7. The positive active material for a lithium secondary battery according to claim 1, which is a powder with an average particle size of 100 μm or less.

8. The positive active material for a lithium secondary battery according to claim 1, having a surface coated with carbon.

* * * * *